(12) United States Patent
Coates et al.

(10) Patent No.: US 6,686,724 B2
(45) Date of Patent: Feb. 3, 2004

(54) METHOD OF AND APPARATUS FOR CONTROLLING CHARGING AND/OR DISCHARGING OF A BATTERY FOR A HYBRID ELECTRIC VEHICLE

(75) Inventors: Calvin Edward Coates, Canton, MI (US); Robert John Melichar, Vernouillet (FR)

(73) Assignee: Ford Motor Company, Dearborn, MI (US)

( * ) Notice: Subject to any disclaimer, the term of this patent is extended or adjusted under 35 U.S.C. 154(b) by 78 days.

(21) Appl. No.: 10/063,866

(22) Filed: May 21, 2002

(65) Prior Publication Data

US 2003/0218447 A1 Nov. 27, 2003

(51) Int. Cl.$^7$ .................. H01M 10/44; H01M 10/46
(52) U.S. Cl. ........................................ 320/135
(58) Field of Search ................. 320/104, 124, 320/125, 127, 128, 134, 136, 135, 137

(56) References Cited

U.S. PATENT DOCUMENTS

| | | | |
|---|---|---|---|
| 4,313,080 A | | 1/1982 | Park |
| 5,153,496 A | | 10/1992 | LaForge |
| 5,159,258 A | | 10/1992 | Kolvites et al. |
| 5,343,970 A | | 9/1994 | Severinski |
| 5,650,239 A | | 7/1997 | Lex et al. |
| 5,828,201 A | * | 10/1998 | Hoffman, Jr. et al. |
| 5,891,590 A | | 4/1999 | King |
| 5,939,861 A | * | 8/1999 | Joko et al. |
| 5,969,624 A | | 10/1999 | Sakai et al. |
| 5,990,662 A | * | 11/1999 | Yang |
| 6,054,842 A | | 4/2000 | Verzwyvelt et al. |
| 6,094,051 A | | 7/2000 | Palanisamy et al. |
| 6,353,304 B1 | * | 3/2002 | Atcitty et al. |

* cited by examiner

*Primary Examiner*—Edward H. Tso
(74) *Attorney, Agent, or Firm*—Marshall, O'Toole

(57) ABSTRACT

This invention is a method and apparatus for controlling charging and/or discharging a battery for a hybrid electric vehicle (HEV).

18 Claims, 4 Drawing Sheets

METHOD OF AND APPARATUS FOR CONTROLLING CHARGING AND/OR DISCHARGING OF A BATTERY FOR A HYBRID ELECTRIC VEHICLE

BACKGROUND OF INVENTION

1. Field of the Invention

The present invention relates generally to a hybrid electric vehicle (HEV), and specifically to a method and an apparatus for controlling charging and/or discharging of a HEV battery.

2. Discussion of the Prior Art

The need to reduce fossil fuel consumption and emissions in automobiles and other vehicles predominately powered by internal combustion engines (ICEs) is well known. Vehicles powered by electric motors attempt to address these needs. Another alternative solution is to combine a smaller ICE with electric motors into one vehicle. Such vehicles combine the advantages of an ICE vehicle and an electric vehicle and are typically called hybrid electric vehicles (HEVs). See generally, U.S. Pat. No. 5,343,970 to Severinsky.

The HEV is described in a variety of configurations. Many HEV patents disclose systems where an operator is required to select between electric and internal combustion operation. In other configurations, the electric motor drives one set of wheels and the ICE drives a different set.

Other, more useful, configurations have developed. For example, a series hybrid electric vehicle (SHEV) configuration is a vehicle with an engine (most typically an ICE) connected to an electric motor called a generator. The generator, in turn, provides electricity to a battery and another motor, called a traction motor. In the SHEV, the traction motor is the sole source of wheel torque. There is no mechanical connection between the engine and the drive wheels. A parallel hybrid electrical vehicle (PHEV) configuration has an engine (most typically an ICE) and an electric motor that work together in varying degrees to provide the necessary wheel torque to drive the vehicle. Additionally, in the PHEV configuration, the motor can be used as a generator to charge the battery from the power produced by the ICE.

A parallel/series hybrid electric vehicle (PSHEV) has characteristics of both PHEV and SHEV configurations and is sometimes referred to as a "powersplit" configuration. In one of several types of PSHEV configurations, the ICE is mechanically coupled to two electric motors in a planetary gear-set transaxle. A first electric motor, the generator, is connected to a sun gear. The ICE is connected to a carrier. A second electric motor, a traction motor, is connected to a ring (output) gear via additional gearing in a transaxle. Engine torque can power the generator to charge the battery. The generator can also contribute to the necessary wheel (output shaft) torque if the system has a one-way clutch. The traction motor is used to contribute wheel torque and to recover braking energy to charge the battery. In this configuration, the generator can selectively provide a reaction torque that may be used to control engine speed. In fact, the engine, generator motor and traction motor can provide a continuous variable transmission (CVT) effect. Further, the HEV presents an opportunity to better control engine idle speed over conventional vehicles by using the generator to control engine speed.

The desirability of combining an ICE with electric motors is clear. There is great potential for reducing vehicle fuel consumption and emissions with no appreciable loss of vehicle performance or drive-ability. The HEV allows the use of smaller engines, regenerative braking, electric boost, and even operating the vehicle with the engine shutdown. Nevertheless, new ways must be developed to optimize the HEV's potential benefits.

One such area of HEV development is in the area of methods and systems for controlling the charging and/or discharging of the HEV battery used to store electricity. As explained above, one advantage of the HEV is the ability to limit ICE usage by operating for periods of time using partially or primarily electric power. Quite obviously, if the ICE is to be substantially or totally shutdown, there must be some mechanism for storing electricity to permit the vehicle to operate under electric power during such periods. A rechargeable battery is a conventional mechanism for charge storage that has attained widespread use.

Typically, the HEV battery is constructed from cells or modules that are coupled together to provide the desired voltage. For example, the common 9-volt household battery is in fact a combination of six 1.5-volt cells or modules coupled together in series. HEV batteries are constructed in a similar manner, and may include upwards of 200 modules.

While HEV batteries may be rechargeable so as to extend their operational life, such rechargeable batteries do not have an unlimited life. Moreover, the life of the rechargeable HEV battery may be foreshortened if proper care is not taken in its use and maintenance.

For example, variations may arise between the performance characteristics of the cells or modules in the HEV battery as a consequence of manufacturing or material tolerances, or flaws that may develop with the passage of time. Such variations can cause the effected module to accept less charge, to store less charge, and to provide less charge. Such variations may also lead to the failure of the module if the module's diminished capacity is exceeded. Consequently, it is known in the art to monitor the charge of the modules and to balance the charge on the modules automatically to prevent overcharging. See, for example, U.S. Pat. Nos. 5,969,624 and 4,313,080.

Maintaining proper charge balance, while helpful to prolong battery life, is not a complete answer to all of the problems, which may cause performance degradation. For example, rechargeable batteries are susceptible to a phenomenon commonly referred to as memory effect. Memory effect occurs when a module or cell is discharged and recharged only partially (shallowly) over several cycles. Eventually, the module will not accept the same charge it did initially.

While memory effect may be detected by the on-board electronics responsible for charge balancing, the onus is commonly put on the user to perform the deep discharge necessary to limit or reverse the memory effect on the effected module. The user may have to connect a separate discharge device to the affected module, or couple a separate on-board discharging circuit to the affected module. However, user intervention may be intentionally or unintentionally delayed such that remedial measures come too late to optimally limit the memory effect.

Moreover, there are other disadvantageous events that may affect battery performance and life that conventionally are not even detected.

SUMMARY OF INVENTION

Accordingly, an object of the present invention is to provide a battery control method and apparatus for a hybrid electric vehicle (HEV) that detects battery life and/or performance degrading events and takes appropriate remedial measures without requiring user intervention.

A further object of the present invention is to provide an HEV battery control method and apparatus that detects battery life and/or performance degrading events and takes appropriate remedial measures while limiting the effects of such remedial measures on vehicle performance.

An additional object of the present invention is to provide specific strategies for controlling charging and/or discharging of an HEV battery in response to battery life and/or performance degrading events while limiting effects on vehicle performance, thereby rendering the battery control method and apparatus transparent to the user.

Other objects of the present invention will become more apparent to persons having ordinary skill in the art to which the present invention pertains from the following description taken in conjunction with the accompanying figures.

DESCRIPTION OF DRAWINGS

The foregoing objects, advantages, and features, as well as other objects and advantages, will become apparent with reference to the description and figures below, in which like numerals represent like elements and in which.

DETAILED DESCRIPTION

Figure 1:
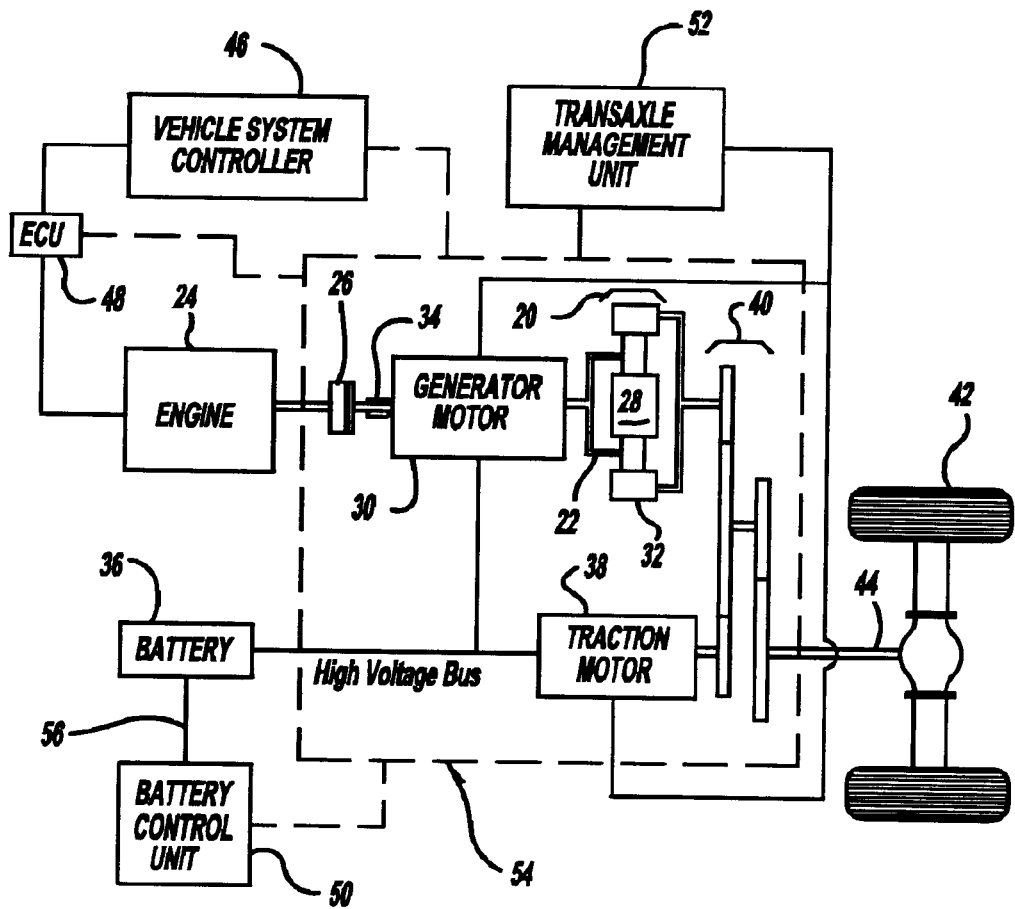
FIG. 1 illustrates a general hybrid electric vehicle (HEV) configuration.

The present invention relates to electric vehicles and, more particularly, hybrid electric vehicles (HEVs). FIG. 1 demonstrates just one possible configuration, specifically a parallel/series hybrid electric vehicle (powersplit) configuration using an Internal Combustion Engine (ICE).

In a basic HEV, a planetary gear set 20 mechanically couples a carrier gear 22 to an engine 24 via a one-way clutch 26. The planetary gear set 20 also mechanically couples a sun gear 28 to a generator motor 30 and a ring (output) gear 32. The generator motor 30 also mechanically links to a generator brake 34 and is electrically linked to a battery 36. A traction motor 38 is mechanically coupled to the ring gear 32 of the planetary gear set 20 via a second gear set 40 and is electrically linked to the battery 36. The ring gear 32 of the planetary gear set 20 and the traction motor 38 are mechanically coupled to drive wheels 42 via an output shaft 44.

The planetary gear set 20, splits the engine 24 output energy into a series path from the engine 24 to the generator motor 30 and a parallel path from the engine 24 to the drive wheels 42. Engine 24 speed can be controlled by varying the split to the series path while maintaining the mechanical connection through the parallel path. The traction motor 38 augments the engine 24 power to the drive wheels 42 on the parallel path through the second gear set 40. The traction motor 38 also provides the opportunity to use energy directly from the series path, essentially running off power created by the generator motor 30. This reduces losses associated with converting energy into and out of chemical energy in the battery 36 and allows all engine 24 energy, minus conversion losses, to reach the drive wheels 42.

A vehicle system controller (VSC) 46 controls many components in this HEV configuration by connecting to each component's controller. An engine control unit (ECU) 48 connects to the engine 24 via a hardwire interface. The ECU 48 and VSC 46 can be based in the same unit, but are actually separate controllers. The VSC 46 communicates with the ECU 48, as well as a battery control unit (BCU) 50 and a transaxle management unit (TMU) 52 through a communication network such as a controller area network (CAN) 54. The BCU 50 connects to the battery 36 via a hardwire interface 56. The TMU 52 controls the generator motor 30 and traction motor 38 via a hardwire interface.

Figure 2:
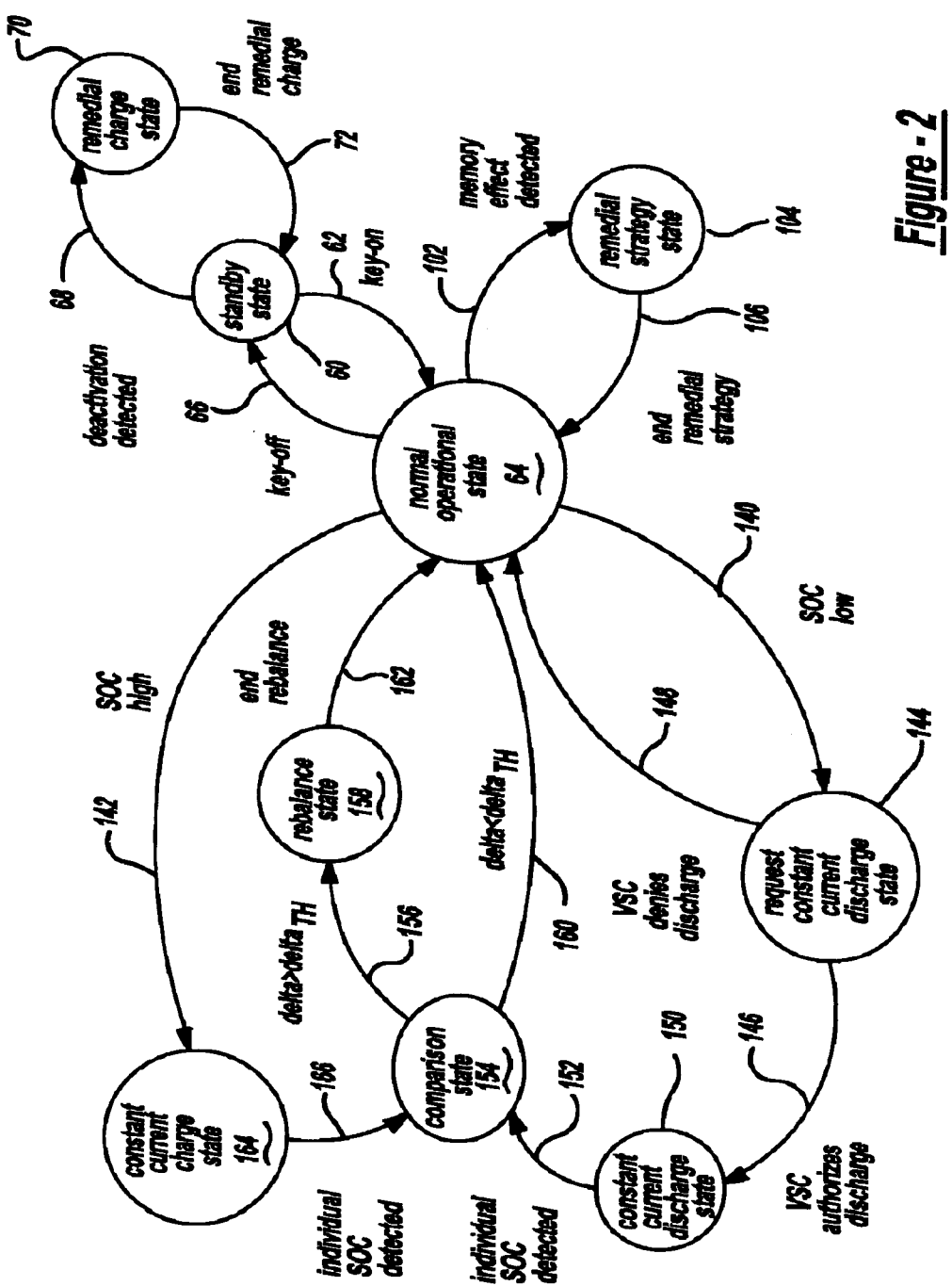
FIG. 2 illustrates an embodiment of the present invention of a method for controlling charging and/or discharging of an HEV battery in response to battery life and/or performance degrading events.

FIG. 2 illustrates an embodiment of a method, implemented by the BCU 50, for controlling charging and/or discharging of an HEV battery, such as the battery 36, in response to battery life and/or performance degrading events, or battery maintenance conditions. According the method illustrated in FIG. 2, the BCU 50 monitors for four battery life and/or performance degrading events.

First, the BCU 50 determines if the battery 36 needs to be charged to reverse deactivation. Deactivation is caused by prolonged duration of idle time at low state of charge (SOC). Deactivation results in reduced ability to accept charge.

Second, the BCU 50 determines if the battery 36 needs to be refreshed to reverse memory effect. Memory effect is caused by repeated shallow discharging and recharging, or cycling, of the battery 36. Memory effect causes a loss of storage capacity.

Third, the BCU 50 determines if the battery 36 needs rebalancing. The typical HEV battery, like the battery 36, is constructed from cells or modules that are coupled together to provide the desired voltage. A typical HEV battery may have as many as 240 modules. The modules of the battery 36 will have different performance characteristics based on manufacturing differences, module age and module temperature, for example. If a module that has diminished charge capacity is overcharged, this can lead to module failure.

Fourth, the BCU 50 determines if the battery 36 needs state of charge reset. A module can be so deeply discharged that the battery reverses. This reversal can adversely affects battery performance, and can cause long-term damage to the module and the circuitry coupled thereto.

While the BCU 50 monitors the battery 36 for these four battery maintenance conditions in implementing the embodiment of the present invention illustrated in FIG. 2, the present invention is not so limited. The BCU 50 implementing an embodiment of the present invention may monitor the battery 36 for other battery life and/or performance degrading events other than those listed above.

Having determined that one of these four conditions exists, the BCU 50 communicates with the VSC 46 via the CAN 54 to determine if the necessary remedial activity can be conducted immediately, or if the activity needs to be delayed to avoid interference with vehicle operations. For example, to refresh the battery 36 to remove memory effect, it may be desirable to deeply discharge and then charge the affected module. It may also be the case that the vehicle is operating in a state or mode where the battery is already in a state of discharge, or the capacity is not available to charge the module. Alternatively, it may be the case that the BCU 50, to determine the state of the battery 36, needs to perform a diagnostic discharge or charge of the module of the battery 36, which diagnostic discharge or charge may affect vehicle performance. Consequently, the BCU 50 preferably first determines if the diagnostic or remedial action would compromise the vehicle's performance by communicating with the VSC 46 and determining a vehicle condition.

In response to the vehicle condition detected by the BCU 50, the BCU 50 performs the actions without the necessity of user interaction according to a schedule that will avoid interference with vehicle operations, delaying the actions if needs be. Moreover, the BCU 50 preferably performs the steps of determining if one of the four conditions exists, determining if the vehicle operational characteristics permits the appropriate diagnostic or remedial actions to be carried out, and taking the appropriate diagnostic and/or remedial actions without requiring the user to provide direction or instruction. In this fashion, battery maintenance becomes a transparent vehicle activity relative to the user, and the user does not have to be concerned about keeping track of scheduled maintenance deadlines.

Turning to the method illustrated in FIG. 2 in greater detail, it will be recognized that the diagram represents the states of the BCU 50 during implementation of the method according an embodiment of the present invention. In particular, the BCU 50 has a standby state 60. The BCU 50 operates in the standby state 60 when the user has not indicated his or her desire to initiate vehicle operation (i.e., the vehicle is non-operational). Typically, the user indicates his or her desire to initiate vehicle operation by activating an input device coupled to the VSC 46, such as by flipping a switch or by placing a key into a cylinder and turning the key in a first direction (simulating the actions typically taken when initiating operation of a vehicle powered by an ICE), also referred to as "key-on". The key-on activity is represented by the arrow 62, leading from the standby state 60 to a normal operational state 64. Conversely, the user can indicate his or her desire to terminate operation of the vehicle by performing a second action, for example turning the key in a second direction. This activity (also referred to as "key-off") is represented by the arrow 66 leading from the normal operational state 64 back to the standby state 60.

As shown in FIG. 2, the BCU 50 may monitor the battery 36 even during the standby state 60. That is, even when the vehicle is non-operational, the BCU 50 may monitor the battery 36 for conditions that are detrimental to battery life and/or performance. Specifically, in a preferred embodiment of the method according to the present invention shown, even during the standby state 60, the BCU 50 may monitor the battery 36 for deactivation requiring remedial charging. Alternatively, this activity could take place at key-on, or during the normal operational state 64.

The BCU 50 may detect that the battery 36 should be charged to reverse deactivation (as represented by the arrow 68), for example, by detecting that the state of charge of the modules is lower than a threshold amount or, preferably, by detecting that the vehicle has remained non-operational for a predetermined time period. In response, the BCU 50 enters a remedial charge state 70 wherein the BCU 50 may initiate operation of the engine 24 or, if the vehicle has been connected to a separate source of electricity, may enable charging of the battery 36 from such separate source. Alternatively, the BCU 50 may delay the remedial charging of the battery 36 until such time as the key-on activity 62 is performed. After remedially charging the battery 36, the BCU 50 returns, as represented by an arrow 72, to the standby state 60.

Figure 3:
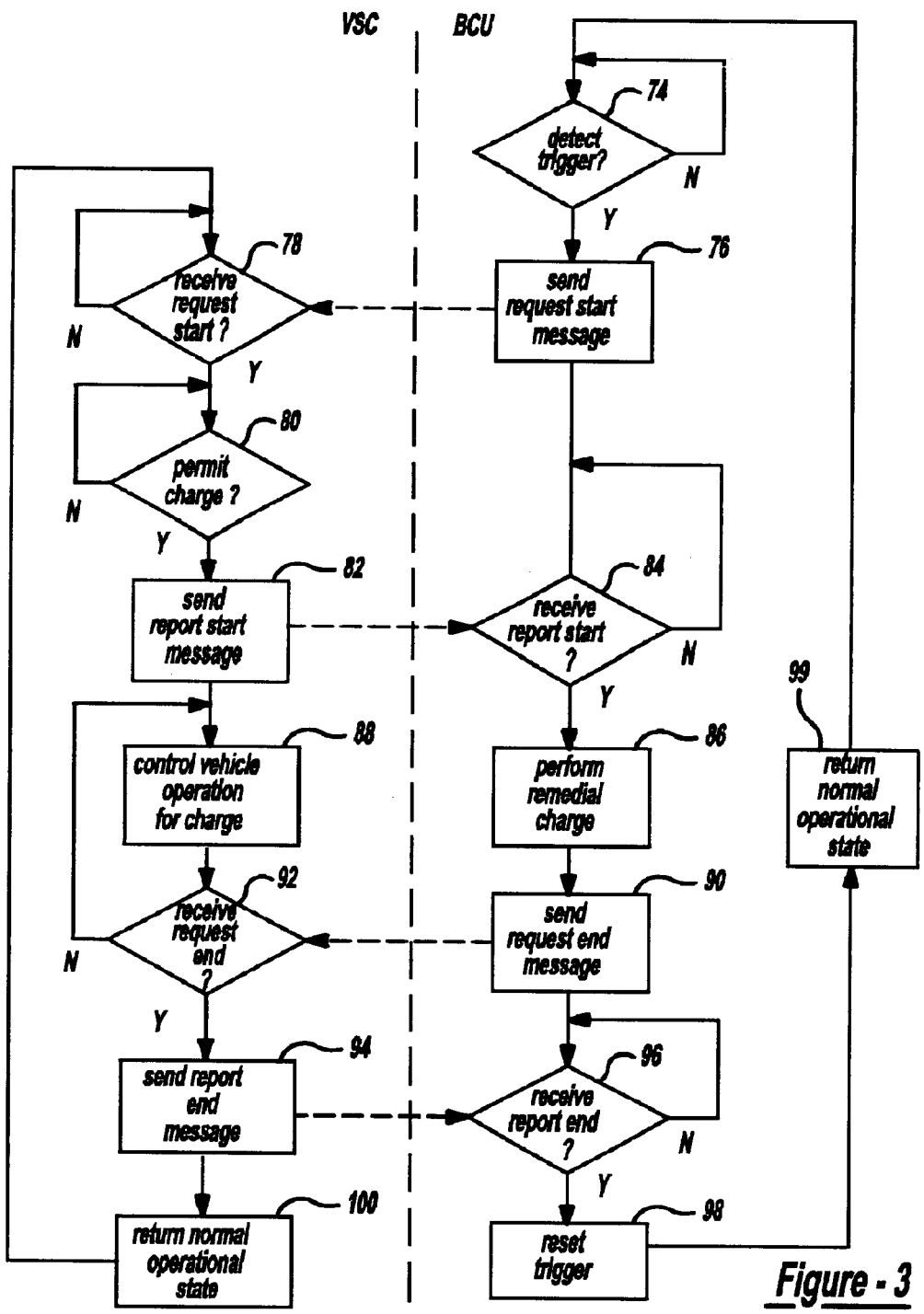
FIG. 3 illustrates an embodiment of the present invention of a method for charging a battery to limit battery deactivation.

As indicated in greater detail in FIG. 3, during the remedial charge state 70, the BCU 50 preferably communicates with the VSC 46 via the CAN 54 to ensure that the remedial charge of the battery 36 will not adversely impact vehicle operation. In particular, as illustrated in FIG. 3, at a block 74, the BCU 50 determines that a trigger event, such as the vehicle being non-operational for a predetermined number of hours, has occurred. The BCU 50 sends "request start" message to the VSC 46 at a block 76 requesting initiation of the remedial charge necessary to counter deactivation. The VSC 46 receives the "request start" message at a block 78, and determines at a block 80 if the BCU 50 may begin the remedial charge, or if the operation state of the vehicle requires the initiation of the remedial charge to be delayed. For example, if the vehicle is designed to perform the remedial charge only when coupled to a separate source of electricity, the VSC 46 may check to see if the vehicle is so coupled and delay the initiation of the remedial charge until such coupling is made. If the VSC 46 determines that the BCU 50 may initiate the remedial charge, the VSC 46 sends a "report start" message at a block 82, which message the BCU 50 receives at a block 84.

The BCU 50 then performs a remedial charge at a block 86. Concurrently, the VSC 46 controls the vehicle operation at a block 88 to provide the charge necessary to permit the BCU 50 to perform the remedial charge at the block 86.

When the remedial charge is complete, the BCU 50 sends a "request end" message to the VSC 46 at a block 90. The VSC 46 receives the "request end" message from the BCU 50 at a block 92, and replies with a "report end" message at a block 94 that the BCU 50 receives at a block 96. The BCU 50 then rests the trigger at a block 98 and returns to standby state 60 at a block 99, while the VSC 46 returns to its standby state at a block 100.

Returning to FIG. 2, it will be recognized that several battery life and/or performance degrading events are monitored during the normal operational state 64. For example, when the BCU 50 determines or detects that the battery 36 should be refreshed to remove memory effect, as represented by the arrow 102, the BCU 50 passes to a remedial strategy state 104 from the normal operational state 64. When the remedial strategy is completed, the BCU 50 returns, as represented by an arrow 106, to the normal operational state 64.

Figure 4:
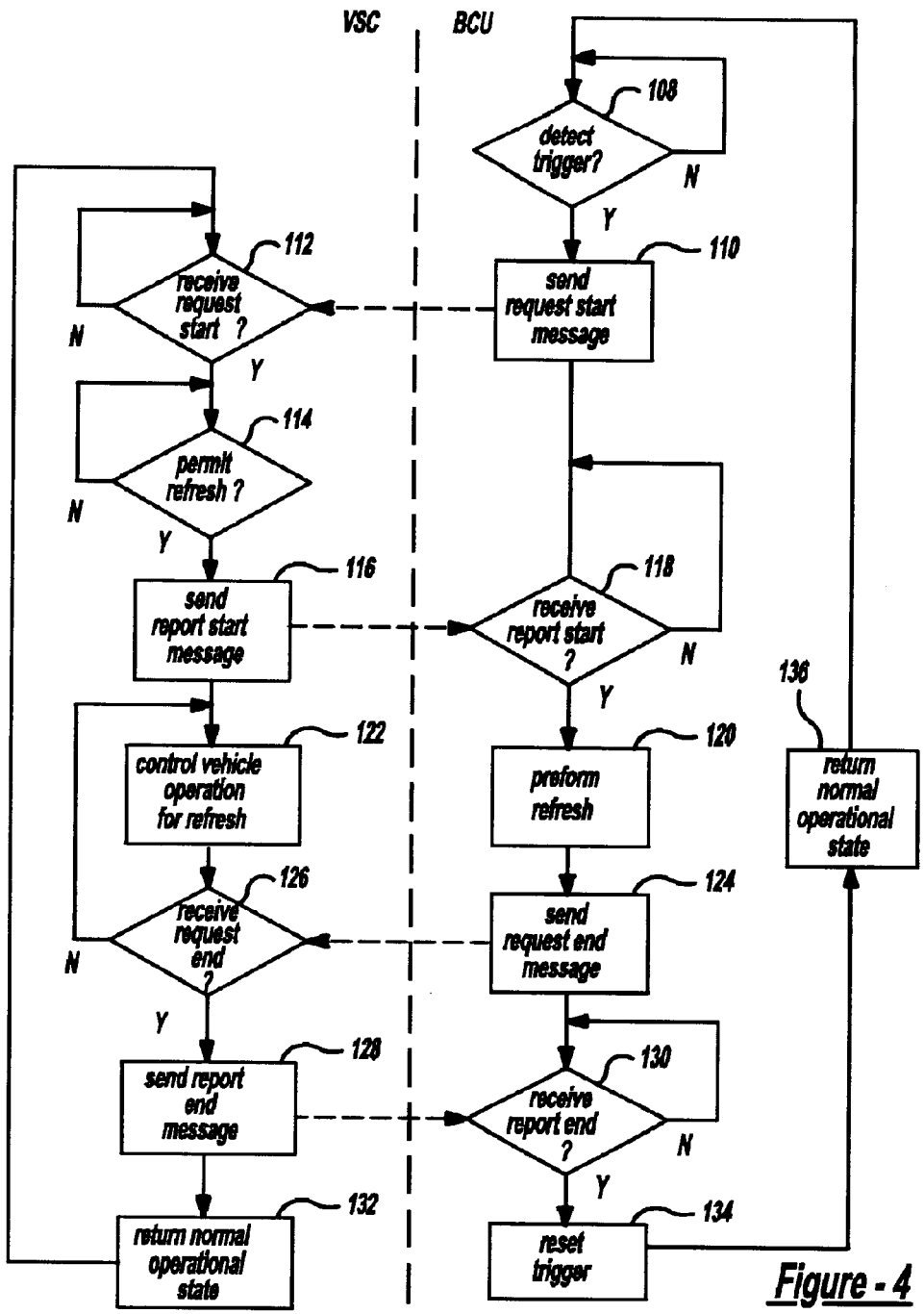
FIG. 4 illustrates an embodiment of the present invention of a method for discharging a battery to limit memory effect.

The remedial vehicle strategy state 104 is shown in greater detail in FIG. 4. Specifically, it will be recognized that the BCU 50 determines at a block 108 that a trigger event has occurred such that refreshing of the battery 36 or of a module of the battery 36 is desirable. For example, the trigger event may preferably be that the module or battery 36 has discharged a predetermined number of Ampere-hours. For example, a module or battery refresh may be scheduled for a discharge period of every 420 Ah. Alternatively, the BCU 50 may use frequency pulses to determine a change in resistance of the cathode, which change may be compared to a threshold level to determine whether the trigger event has occurred. When the trigger event occurs, the BCU 50 sends a "request start" message to the VSC 46 at a block 110, and the VSC 46 receives the message at a block 112.

The VSC 46 may not immediately return authorization to the BCU 50 to begin the remedial activity. Instead, the VSC 46 determines at a block 114 whether the operational state of the vehicle will permit the desired remedial action to occur. For example, because the remedial strategy employed by the BCU 50 will involve a deep discharge of the module or battery 36 followed by a complete recharge, the VSC 46 may delay the implementation of the strategy until such time as the operational state of the vehicle permits discharging and recharging. When the VSC 46 determines that the remedial strategy may be implemented, the VSC 46 sends a "report start" message at a block 116, which the BCU 50 receives at a block 118.

The BCU 50 then implements the remedial strategy at a block 120. As indicated above, in the case where the BCU 50 determines that a condition has occurred where refresh would be appropriate, the BCU 50 performs a deep discharge of the module or battery 36, followed by a charging of the module or battery 36. Concurrently, the VSC 46 operates the vehicle to permit the BCU 50 to deeply discharge and recharge the module or battery 36 at a block 122.

After the remedial strategy has been implemented, the BCU 50 and the VSC 46 exchange "request end" and "report end" messages at blocks 124, 126, 128, 130. Upon transmittal of the "report end" message at the block 128, the VSC 46 returns to normal operational state at a block 132. Upon receipt of the "report end" message at the block 130, the BCU 50 resets the trigger (or counter) at a block 134 and returns to the normal operational state 64 at a block 136.

During normal operational mode 64, the modules of the battery 34 may also need to be rebalanced or have their state of charge (SOC) reset. Returning to the FIG. 2, it will be recognized that preferably the BCU 50 determines whether these activities need be performed according to a combined or unified strategy. Alternatively, the BCU 50 may separately determine if the modules of the battery 36 need rebalancing or if a module needs its charge reset.

Again, as illustrated in FIG. 2, the combined or unified rebalance/reset strategy utilizes a two level or tier approach. As a first level of inquiry, a determination is made whether the SOC of a module, as represented by a module voltage under normal operating conditions, is within a predetermined range. If the SOC thus determined is within the predetermined range, the BCU 50 remains in the normal operational state 64. If, however, the SOC is below a lower limit or threshold of the predetermined range (as represented by an arrow 140) or above an upper limit or threshold of the predetermined range (as represented by an arrow 142), then the BCU 50 makes a further inquiry.

Taking first the condition wherein the SOC is lower than the predetermined lower threshold, the BCU 50 passes to a state 144 wherein the BCU 50 communicates with the VSC 46 for authorization to begin a constant current discharge under which conditions the BCU 50 can make a more refined determination of the SOC of the module. The VSC 46 may authorize the constant current discharge, as represented by an arrow 146, or prevent the constant current discharge, as represented by an arrow 148. If the VSC 46 prevents the constant current discharge, the BCU 50 returns to state 64.

If the VSC 46 authorizes a constant current discharge, the BCU 50 passes to a state 150 wherein a constant current discharge is performed and a SOC determined for the module at issue. The BCU 50 then passes, as represented by an arrow 152, to a state 154 wherein the SOC of the module is compared to a predetermined SOC and a difference, or Δ ("delta") value, is calculated. If the Δ value for the module exceeds a predetermined threshold Δ (Δ th or "deltath") value, then the BCU 50 passes, as represented by an arrow 156, to a rebalancing state 158. Alternatively, if A value of the module is less than the Δ th value, then the BCU 50 passes, as represented by an arrow 160, to the normal operational state 64.

In the rebalancing state 158, the BCU 50 communicates with the VSC 46 to determine if the rebalancing activity can be performed, or if the activity needs to be delayed to avoid interference with desired vehicle operations. With appropriate authorization from the VSC 46, the BCU preferably uses a current shuttle method to charge the module. That is, the module at a lower SOC is charged while the modules at a higher SOC are not charged, or bypassed. When the rebalancing is completed, the BCU passes, as represented by an arrow 162, to the normal operational state 64.

Returning to a situation wherein the SOC based on voltage under normal conditions indicates a possible high SOC condition, the BCU 50 passes, as represented by an arrow 142, from the normal operational mode 64 to a state 164. In the state 164, the BCU 50 performs a constant current charge of the module and the SOC of the module is measured. The BCU 50 then passes, as represented by an arrow 166 to the state 154 discussed above, from which the BCU 50 passes directly back to the normal operational state 64 or via the rebalancing state 158 to the normal operation state 64. If a Δ value greater than the Δ th value is detected, then a controlled discharge is performed in the rebalancing state 158 in accordance with authorization received from the VSC 46 to decrease the SOC of the module.

As noted above, the BCU 50 implementing the method according to an embodiment of the present invention controls the charging and discharging of the battery 36, and more particularly the modules of the battery 36, to address battery life and/or performance degrading events. Moreover, the BCU 50 operating according to the embodiment of the present invention controls the charging and discharging of the battery 36 without user intervention and in accordance with the vehicle operational state, such that the control is transparent to the user.

While the BCU 50 implementing the method according to an embodiment of the present invention has been discussed as incorporated into an HEV with an ICE, the BCU 50 may be modified using ordinary skill so as to be incorporated into an HEV using a fuel cell. Consequently, the BCU 50 implementing the method according to the present invention is not limited to a particular type of HEV.

In summary, the above-described embodiment(s) of the invention is/are provided purely for purposes of example. Many other variations, modifications, and applications of the invention may be made.

What is claimed is:

1. A method of controlling charging and discharging of a multi-module battery for a hybrid vehicle, the method comprising the steps of:

detecting a battery maintenance condition requiring at least one of charging and discharging a module of the battery;

detecting a vehicle condition;

selectively performing at least one of charging and discharging a module of the battery in response to the battery maintenance condition and the vehicle condition without user intervention.

2. The method of claim 1, wherein the step of selectively performing at least one of charging and discharging comprises delaying performing the at least one of charging and discharging required by the battery maintenance condition in response to the vehicle condition.

3. The method of claim 1, wherein the step of selectively performing at least one of charging and discharging comprises immediately performing the at least one of charging and discharging required by the battery maintenance condition in response to the vehicle condition.

4. The method according to claim 1, wherein the hybrid vehicle has an operational state and a non-operational state, and:

the step of detecting a battery maintenance condition comprises detecting a time period after the vehicle transitions from the operational state to the non-operational state; and the step of selectively performing at least one of charging and discharging comprises charging a module of the battery.

5. The method according to claim 1, wherein:

the step of detecting a battery maintenance condition comprises detecting a discharge period for a module of the battery; and the step of performing at least one of charging and discharging comprises discharging the module and then charging the module.

6. The method according to claim 1, wherein the step of detecting a battery maintenance condition comprises detecting a state of charge of a module of the battery under normal conditions, and then detecting a state of charge of the module under controlled conditions if the state of charge of the module under normal conditions is not within a predetermined range.

7. The method according to claim 6, wherein the step of detecting a state of charge of a module of the battery under normal conditions comprises detecting a voltage of a module of the battery under normal conditions.

8. The method according to claim 6, wherein:

the step of detecting a state of charge of the module under controlled conditions comprises detecting a state of charge of the module under a constant current discharge if the state of charge of the module detected under normal conditions is below a threshold; and the step of performing at least one of charging and discharging comprises charging the module if the difference between the state of charge detected under constant current discharge and a predetermined state of charge exceeds a threshold.

9. The method according to claim 6, wherein:

the step of detecting a state of charge of the module under controlled conditions comprises detecting a state of charge of the module under a constant current charge if the state of charge of the module detected under normal conditions is above a threshold; and the step of performing at least one of charging and discharging comprises discharging the module if the difference between the state of charge detected under constant current discharge and a predetermined state of charge exceeds a threshold.

10. A system for controlling charging and discharging of a battery for a hybrid vehicle, the system comprising:

a processor; and a program which controls the processor (i) to detect a battery maintenance condition requiring at least one of charging and discharging a module of the battery, (ii) to detect a vehicle condition, and (iii) to selectively control auxiliary circuitry to perform at least one of charging and discharging a module of the battery in response to the battery maintenance condition and the vehicle condition without user intervention.

11. The system of claim 10, wherein the program controls the processor to selectively perform at least one of charging and discharging by delaying performing the at least one of charging and discharging required by the battery maintenance condition in response to the vehicle condition.

12. The system of claim 10, wherein the program controls the processor to selectively perform at least one of charging and discharging by immediately performing the at least one of charging and discharging required by the battery maintenance condition in response to the vehicle condition.

13. The system of claim 10, wherein the hybrid vehicle has an operational state and a non-operational state, and:

the program controls the processor to detect a battery maintenance condition by detecting a time period after the vehicle transitions from the operational state to the non-operational state; and the program controls the processor to selectively perform at least one of charging and discharging by charging a module of the battery.

14. The system of claim 10, wherein the program controls the processor:

to detect a battery maintenance condition by detecting a discharge period for a module of the battery; and to perform at least one of charging and discharging by discharging the module and then charging the module.

15. The system of claim 10, wherein the program controls the processor to detect a battery maintenance condition by detecting a state of charge of a module of the battery under normal conditions, and then by detecting a state of charge of the module under controlled conditions if the state of charge of the module under normal conditions is not within a predetermined range.

16. The system of claim 15, wherein the program controls the processor to detect a state of charge of a module of the battery under normal conditions by detecting a voltage of a module of the battery under normal conditions.

17. The system of claim 15, wherein the program controls the processor:

to detect a state of charge of the module under controlled conditions by detecting a state of charge of the module under a constant current discharge if the state of charge of the module detected under normal conditions is below a threshold; and to perform at least one of charging and discharging by charging the module if the difference between the state of charge detected under constant current discharge and a predetermined state of charge exceeds a threshold.

18. The system of claim 15, wherein the program controls the processor:

to detect a state of charge of the module under controlled conditions by detecting a state of charge of the module under a constant current charge if the state of charge of the module detected under normal conditions is above a threshold; and to perform at least one of charging and discharging by discharging the module if the difference between the state of charge detected under constant current discharge and a predetermined state of charge exceeds a threshold.

* * * * *